Figure 1A:
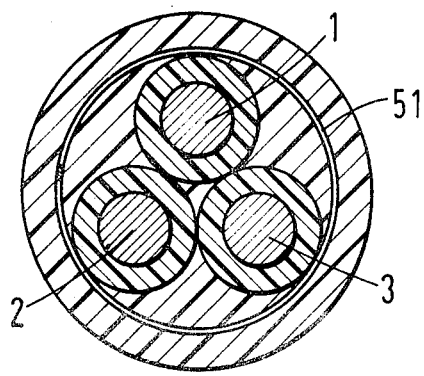

United States Patent

[11] 3,602,772

| [72] | Inventors | Eckhardt Hundhausen;<br>Walter Kolb, both of Betzdorf/Sieg,<br>Germany |
|---|---|---|
| [21] | Appl. No. | 859,850 |
| [22] | Filed | Sept. 22, 1969 |
| [45] | Patented | Aug. 31, 1971 |
| [73] | Assignee | Wolf-Gerate GmbH<br>Betzdorf/Sieg, Germany |
| [32] | Priority | Dec. 4, 1968, Dec. 13, 1968 |
| [33] | | Germany |
| [31] | | P 18 12 737.2 and P 18 14 653.7 |

[54] PROTECTIVE CIRCUIT FOR ELECTRICALLY DRIVEN LAWN MOWERS AND THE LIKE
14 Claims, 9 Drawing Figs.

[52] U.S. Cl. .................................................. 317/18 R,
    317/45
[51] Int. Cl. ..................................................... H02h 5/10
[50] Field of Search.......................................... 317/44, 45,
    18, 13

[56] References Cited
UNITED STATES PATENTS

| 1,257,452 | 2/1918 | Bowden et al. ............... | 317/45 |
| 1,337,866 | 4/1920 | Whitaker...................... | 317/45 |
| 1,602,993 | 10/1926 | Tinsley et al................. | 317/44 |

FOREIGN PATENTS

| 952,833 | 10/1956 | Germany...................... | 317/45 |
| 1,058,813 | 3/1954 | France ......................... | 317/45 |

Primary Examiner—James D. Trammell
Attorney—Ostrolenk, Faber, Gerb & Soffen

ABSTRACT: A protective circuit for lawn mowers etc. comprises a cable with two auxiliary conductors, forming a circuit which when interrupted brings about interruption of the supply of power through the cable.

SHEET 1 OF 2

Inventors:
ECKHARDT HUNDHAUSEN
WALTER KOLB
By
Ostrolenk, Faber, Gerb & Soffen
ATTORNEYS

PROTECTIVE CIRCUIT FOR ELECTRICALLY DRIVEN LAWN MOWERS AND THE LIKE

FIELD TO WHICH THE INVENTION RELATES

The present invention relates to a protective or safety circuit, more particularly for electric motor-driven lawnmowers, hedge trimmers and other devices supplied with power from a cable, with which there is the danger that unskillfull handling of the appliance may lead to cutting or other damage to the power supply cable. Such damage represents a danger for the operator if he should come into contact with the cut conductors of the cable which are energized.

This safety problem occurs especially in the case of lawnmowers driven electrically because the power supply cable often has to pass over large areas and may frequently be overlooked in the grass.

Notwithstanding that lawnmowers today on the market are built to such high safety standards that even if they are damaged the user cannot come into contact with parts under voltage, a substantial number of prospective customers are discouraged from buying such machines by the possibility of danger of cutting of the cable. It has been found that when a cable is grazed by a cut or is completely severed the user may not pull out the plug and may well examine the cable for damage, something which may well lead to a dangerous electric shock being received.

One object of the present invention is to provide a safety cable or safety arrangement which in every case, irrespective of whether the cable is damaged by a grazing, cut or cut right through, provides for a certain interruption of the supply of current.

The invention relates more particularly to a safety circuit for electrically driven lawnmowers and the like, comprising a safety cable which besides the main conductors carrying the voltage includes an auxiliary conductive circuit whose conductors perform a protective function when the cable is damaged. The invention achieves the object posed in that that the auxiliary conductor or conductors is or are so arranged in the cross section of the cable that before the main conductor insulation is cut the auxiliary conductor is severed and the current flowing through the auxiliary conductor, normally having a low voltage, is interrupted and a device actuated by the auxiliary current switches off the main power current supply.

This auxiliary conductor circuit is only required to conduct a relatively low signal current and its conductors can be of a small cross section so that damage of the auxiliary conductor or conductors is certain to occur if any external damage of the cable occurs. For safety reasons a voltage is used for the auxiliary conductor circuit which cannot prove fatal, for example a voltage below 48 volts. This auxiliary conductor circuit can conveniently control the excitation of a relay which switches the main conductor on and off. Preferably the arrangement is such that a signal current continuously flows through the main conductor circuit as long as the cable is undamaged and this signal current excites the relay so as to switch on the main conductors. On severing such an auxiliary conductor the auxiliary signal circuit is interrupted, the relay is opened and consequently the current supply in the main conductors is interrupted. The arrangement of the auxiliary conductor in the cross section of the cable can be in accordance with a number of different schemes, it only being necessary to insure that when the cable receives a grazing or severing cut the auxiliary conductor is first severed before one of the main conductors is touched. For example, the auxiliary conductor may be wound helically or it is possible to provide wires which are arranged around the periphery of the cable casing and run parallel to the axis of the cable with a particular angular spacing between them. These wires can be connected in series.

If the cable has a ground conductor or a neutral conductor, the latter can be connected so as to form part of the auxiliary signal circuit and serve as the return conductor for the current.

In accordance with a further embodiment of the invention the auxiliary conductor is in the form of copper strands twisted onto a cotton or other threads. These threads covered with twisted copper strands can be placed singly or bundled together at that positions of the cable which will be cut by a knife before it makes contact with the main conductors.

The use of such wires in the form of cotton core threads surrounded with twisted copper strands has the advantage of a high degree of elasticity. The flexibility of the cable is in no way impaired by the incorporation of such auxiliary conductors consisting of cores of insulating fibers surrounded by twisted copper strands.

Instead of such cotton cores and copper strands it is also possible to make use of litz wires with very fine individual wire filaments, though for reasons of flexibility the use of conductors consisting of cotton cores with surrounding twisted copper strands is more advantageous.

In what follows the embodiments of the invention will be described with reference to the drawing.

FIGS. 1A, 2A, 3A and 4A represent cross-sectional views through various embodiments of safety cables in accordance with the invention.

FIGS. 1B, 2B, 3B and 4B diagrammatically show side views of the tables shown in FIGS. 1A to 4A.

Figure 3A:
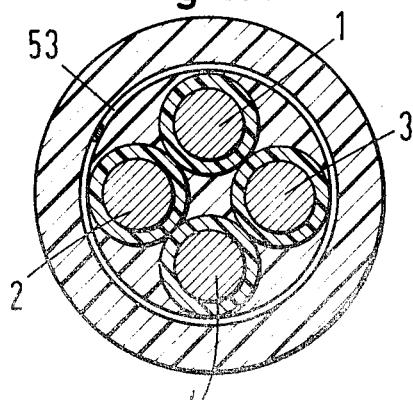
Figure 4A:
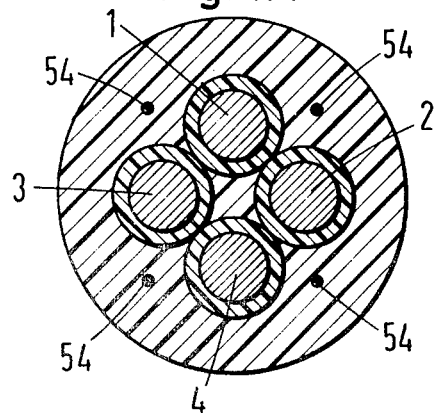
Figure 3B:
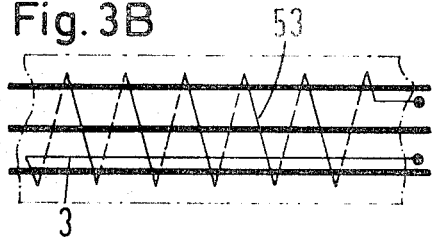
Figure 4B:
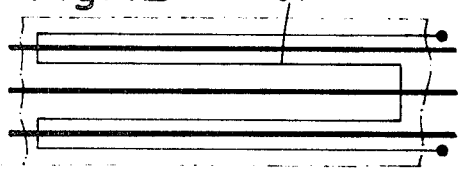
Figure 5:
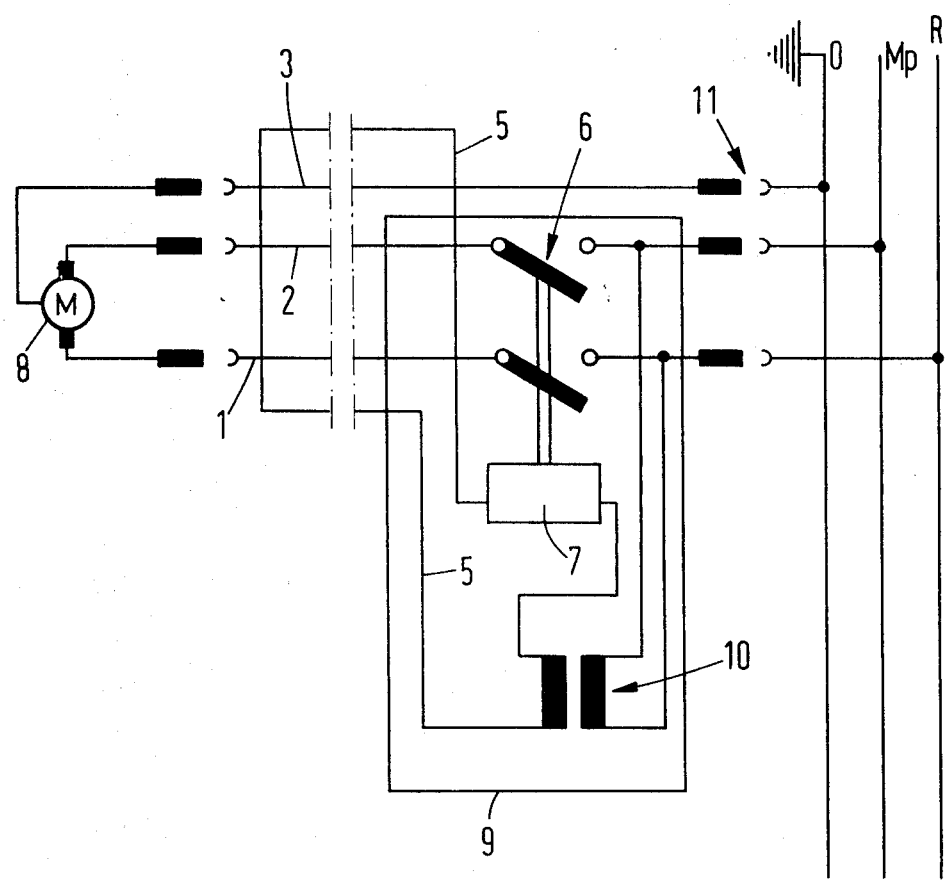

FIG. 5 is a circuit diagram of a safety current circuit using cables in accordance with FIGS. 1A to 4A.

Figure 2A:
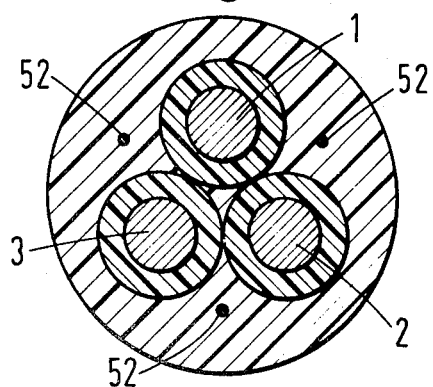
Figure 1B:
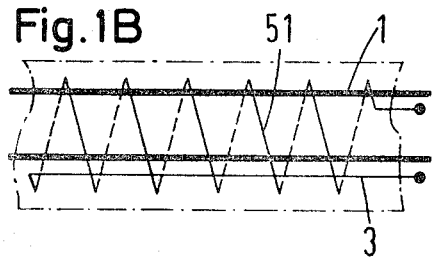

Besides the three main conductors 1, 2, 3 in accordance with figures 1A and 2A and the four main conductors 1, 2, 3, 4 in accordance with FIGS. 3A and 4A the safety protective cable in accordance with the invention comprises an auxiliary conductor circuit. The auxiliary conductor 5 of this circuit has a relatively small cross section and is incorporated within the cable casing inclosing the main conductors so that with a comparatively slight degree of damage to the insulation of the cable, or a cut, at any position this auxiliary conductor 5 will be severed so that no current can pass through it. In accordance with FIG. 1A the auxiliary conductor 51 is wound helically, the main conductor 3 serving as a return conductor. Such a three conductor system in accordance with FIG. 1A can be used in a device provided with protective insulation, in which the cable is firmly anchored. A four-core construction in accordance with FIG. 3A or FIG. 3B also having a helical auxiliary conductor 53 and a main conductor 3 can be used when cables not permanently connected to an appliance are used.

Figure 2B:
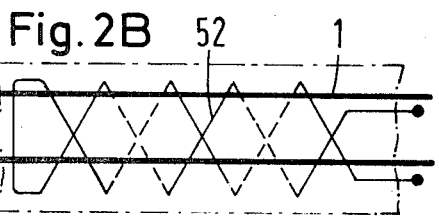

In the case of the embodiment in accordance with FIGS. 2A and 2B the auxiliary conductor 52 is arranged crosswise so as to run in a zigzag pattern forwards and then back again. In this case the auxiliary conductors can be insulated while in the case of the embodiment in accordance with FIGS. 1A, 3A and 5 conducting cores without insulation can be provided.

In accordance with the embodiments of FIGS. 4A and 4B the auxiliary conductor 54 is arranged so as to be parallel to the axis of the cable, several wire sections being arranged around the main conductor so as to be parallel to one another with a constant angular spacing. There is a series circuit connection as is shown in FIG. 4B.

As can be seen from FIGS. 1A to 4A in each case, when the auxiliary conductor circuit is severed, a signal is produced in the manner to be described.

In accordance with FIG. 5 the safety or protective cable is connected to the single face line or main with three conductors R, Mp and O. The main conductors 1 and 2 are connected with a double-pole switch 6 of a relay 7. The neutral conductor 3 is connected directly with the motor housing 8 and the shaft. In housing 9 accommodating the switch 6 and the relay 7, a transformer 10 is accommodated whose primary is connected with the phase Mp and the phase R, while the secondary winding of the transformer 10 is connected with the auxiliary conductor circuit 5. The secondary winding of the transformer 10 provides a voltage of for instance about 48 v. which does not prove lethal if applied to the human body.

As soon as the safety or protective cable is switched on by means of a plug 11 bringing it in connection with the line or main, the relay 7 receives current, as long as the cable is in an undamaged condition, via the auxiliary current circuit 5 from the secondary winding of the transformer 10. Owing to the excitation of the relay 7 the two-pole switch 6 actuated by it is closed so that the motor can be switched on. If now the auxiliary current circuit is interrupted at any particular position, the relay is instantaneously deprived of current and the main switch 6 is opened so that the whole cable is deprived of current.

The unit comprising the transformer and the relay can be rigidly connected with the plug, though, however, instead of this the cable can form a unit with this combination of transformer and relay and from the relay a short piece of cable is led to the socket in order not to load the socket unduly with the weight of the transformer and the relay. It is, however, also possible to fit all three parts, that is to say including the socket, together to form an integral unit.

We claim:

1. A protective circuit for use in protecting persons against electric shock from a circuit coupling a source to a load comprising:
    an elongated cable having input and output ends for releaseable connection with a power source and a load, respectively;
    said cable having at least first and second axially aligned main conductors;
    insulation means;
    said main conductors being imbedded in said insulation means;
    at least one slender auxiliary conductor imbedded in said insulation means and being positioned intermediate said main conductors and the outer surface of said cable;
    the diameter of said auxiliary conductor being substantially smaller than the diameters of the main conductors;
    the ends of said auxiliary conductor being positioned at one end of said cable, whereby said auxiliary conductor forms an elongated conductive loop extending substantially the entire length of said cable;
    power coupling means having input means coupled across said main conductors and output means coupled across the ends of said auxiliary conductor for energizing said auxiliary conductor when said main conductors are energized;
    power sensing means connected to said auxiliary conductor;
    switch means connected to said main conductors being operable between an open and closed position;
    said power sensing means including means for moving said switch means to the open position when said auxiliary conductor is energized and for moving said switch means to the open position when said auxiliary conductors are deenergized.

2. The structure as set forth in claim 1 wherein said power sensing means comprises a relay energized by said auxiliary conductor, said switch means being adapted to be operated by said relay to selectively energize the main conductors.

3. The structure as set forth in claim 1 wherein said power coupling means comprises a transformer said output means comprising a secondary winding connected with the auxiliary conductor and the relay; said input means comprising a primary winding of the transformer being connected across said main conductors.

4. The structure as set forth in claim 1 in which said auxiliary conductor comprises at least first and second axially aligned parallel portions, said parallel portions having an even angular spacing and being connected in series at one end of said cable.

5. The structure as set forth in claim 1 in which said auxiliary conductor comprises first and second portions each extending the length of said cable; said first and second portions crossing over each other and surrounding said main conductors; said helically wound portions being insulated from one another.

6. The structure as set forth in claim 4 in which said main conductors further include an axially aligned return conductor serving simultaneously as a ground conductor and as one of said auxiliary conductor axially aligned portions.

7. The structure as set forth in claim 3 comprising a housing in which the transformer, the relay and the switch means are accommodated.

8. The structure as set forth in claim 7 comprising a socket which is connected with the housing.

9. The structure as set forth in claim 7 further comprising a cable connecting piece coupled to said main conductors at one end of said cable for releasable connection with said socket.

10. The structure as set forth in claim 1 in which the auxiliary conductor is in the form of a textile thread with copper strand twisted around it.

11. The structure as set forth in claim 10 in which the thread with surrounding copper strand is accommodated as an auxiliary conductor individually or bundled in the insulation of the cable.

12. The structure as set forth in claim 1 in which the auxiliary conductor is in the form of litz with fine individual wires.

13. The structure as set forth in claim 3 wherein said transformer is adapted to provide a stepped down voltage in the secondary winding whereby the voltage level in the auxiliary conductor is maintained at a nonlethal value.

14. The structure as set forth in claim 1 in which said auxiliary conductor is comprised of an axially aligned conductor portion and a helically wound conductor portion surrounding said main conductors; said portions being connected in series at one end of said cable and being electrically insulated.